(12) United States Patent
Clark et al.

(10) Patent No.: US 7,290,037 B2
(45) Date of Patent: Oct. 30, 2007

(54) SCALABLE WIRELESS REMOTE CONTROL AND MONITORING SYSTEM WITH AUTOMATIC REGISTRATION AND AUTOMATIC TIME SYNCHRONIZATION

(76) Inventors: Todd A. Clark, 3454 Boone Grove Rd., Valparaiso, IN (US) 46385; Robert C. Florin, 3324 165th St., Hammond, IN (US) 46323

( * ) Notice: Subject to any disclaimer, the term of this patent is extended or adjusted under 35 U.S.C. 154(b) by 0 days.

(21) Appl. No.: 10/225,929

(22) Filed: Aug. 22, 2002

(65) Prior Publication Data

US 2004/0039813 A1 Feb. 26, 2004

(51) Int. Cl.
G06F 15/16 (2006.01)
G06F 15/173 (2006.01)

(52) U.S. Cl. ........................ 709/208; 709/224

(58) Field of Classification Search .............. 709/224, 709/223, 227, 228, 208, 209, 210, 211; 340/3.51, 340/3.7
See application file for complete search history.

(56) References Cited

U.S. PATENT DOCUMENTS

| | | | | |
|---|---|---|---|---|
| 5,254,908 A | | 10/1993 | Alt et al. ..................... 315/312 |
| 5,886,647 A | * | 3/1999 | Badger et al. ......... 340/825.69 |
| 5,898,384 A | | 4/1999 | Alt et al. ............... 340/825.36 |
| 5,911,747 A | | 6/1999 | Gauthier ................... 62/176.6 |
| 5,936,362 A | | 8/1999 | Alt et al. ..................... 315/312 |
| 6,005,759 A | * | 12/1999 | Hart et al. ..................... 361/66 |
| 6,018,657 A | * | 1/2000 | Kennedy et al. ......... 455/426.1 |
| 6,023,507 A | * | 2/2000 | Wookey ..................... 709/223 |
| 6,094,674 A | * | 7/2000 | Hattori et al. .............. 709/203 |
| 6,094,681 A | * | 7/2000 | Shaffer et al. .............. 709/224 |
| 6,104,313 A | | 8/2000 | Boyd, II ....................... 340/3.1 |
| 6,125,390 A | * | 9/2000 | Touboul ..................... 709/223 |
| 6,204,615 B1 | | 3/2001 | Levy ........................... 315/312 |
| 6,219,590 B1 | * | 4/2001 | Bernaden et al. ........... 700/277 |
| 6,236,332 B1 | * | 5/2001 | Conkright et al. ........... 340/3.1 |
| 6,244,758 B1 | * | 6/2001 | Solymar et al. ............ 709/224 |
| 6,249,885 B1 | * | 6/2001 | Johnson et al. ............... 714/47 |
| 6,370,161 B1 | * | 4/2002 | Ehrlich et al. .............. 370/516 |
| 6,374,079 B1 | * | 4/2002 | Hsu ......................... 455/11.1 |
| 6,377,001 B2 | | 4/2002 | Levy ........................... 315/312 |
| 6,385,510 B1 | * | 5/2002 | Hoog et al. ................. 700/276 |
| 6,505,245 B1 | * | 1/2003 | North et al. ................ 709/223 |
| 6,529,723 B1 | * | 3/2003 | Bentley ...................... 455/405 |
| 6,650,890 B1 | | 11/2003 | Irlam et al. |

(Continued)

OTHER PUBLICATIONS

Nunes, R.J.C.; Delgado, J.C.M.; "An Internet application for home automation" Electrotechnical Conference, 2000. MELECON 2000. 10th Mediterranean , vol. 1, May 29-31, 2000 pp. 298-301 vol. 1.*

(Continued)

Primary Examiner—Kenny Lin

(57) ABSTRACT

A system for controlling, monitoring and receiving data from a plurality of devices located at a remote site. A network operations center (NOC) has a plurality of protocols for a plurality of applications. A customer interface with the NOC provides customer control and monitoring of the devices and enables the customer to receive alert notifications from the devices. Master, remote and remote slave units communicate between the NOC and the devices at the remote site, and enable one remote slave unit to communicate with many devices. Registration subroutines are periodically initiated in the system to automatically identify, and to enable communication with, any newly added or removed components. The system also periodically initiates a time synchronization subroutine to synchronize the real time clocks in all system components to Greenwich Mean Time to insure the accuracy of time associated with alert notifications.

15 Claims, 11 Drawing Sheets

Remote Site Diagram

U.S. PATENT DOCUMENTS

| | | | | |
|---|---|---|---|---|
| 6,654,801 B2* | 11/2003 | Mann et al. | ............... | 709/224 |
| 6,727,816 B1* | 4/2004 | Helgeson | ................... | 340/540 |
| 6,845,396 B1* | 1/2005 | Kanojia et al. | ............ | 709/224 |
| 6,854,010 B1* | 2/2005 | Christian et al. | .......... | 709/223 |
| 2002/0028675 A1* | 3/2002 | Schmutz et al. | ............ | 455/424 |
| 2002/0178295 A1* | 11/2002 | Buczek et al. | ............. | 709/250 |

OTHER PUBLICATIONS

Koon-Seok Lee et al.; "A new control protocol for home appliances-LnCP" Industrial Electronics, 2001. Proceedings. ISIE 2001. IEEE International Symposium on, vol. 1, Jun. 12-16, 2001 pp. 286-291 vol. 1.*

"*How does eMAC work?*", by Pentech Solutions, one page, date n/a.

"*Mobitex: Mobile Internet Solutions—here and now*", from Ericsson Mobitex website, May 15, 2002.

"*About Mobitex: What is Mobitex?*", from Ericsson Mobitex website, date n/a.

*Product Portfolio: Mobitex network components*, from Ericsson Mobitex website, Dec. 8, 2001.

"*Mobile Data Magazine: Issued No. 2 2002—Mobitex Middlewear*", from Ericsson Mobitex website, May 8, 2002.

"*Ericsson Modems: M3000 modem*", from Ericsson Mobitex website, Dec. 8, 2001.

\* cited by examiner

Fig. 1 - Architecture Overview

Fig. 2 - Remote Site Diagram

Fig. 4 - P1810 Architecture
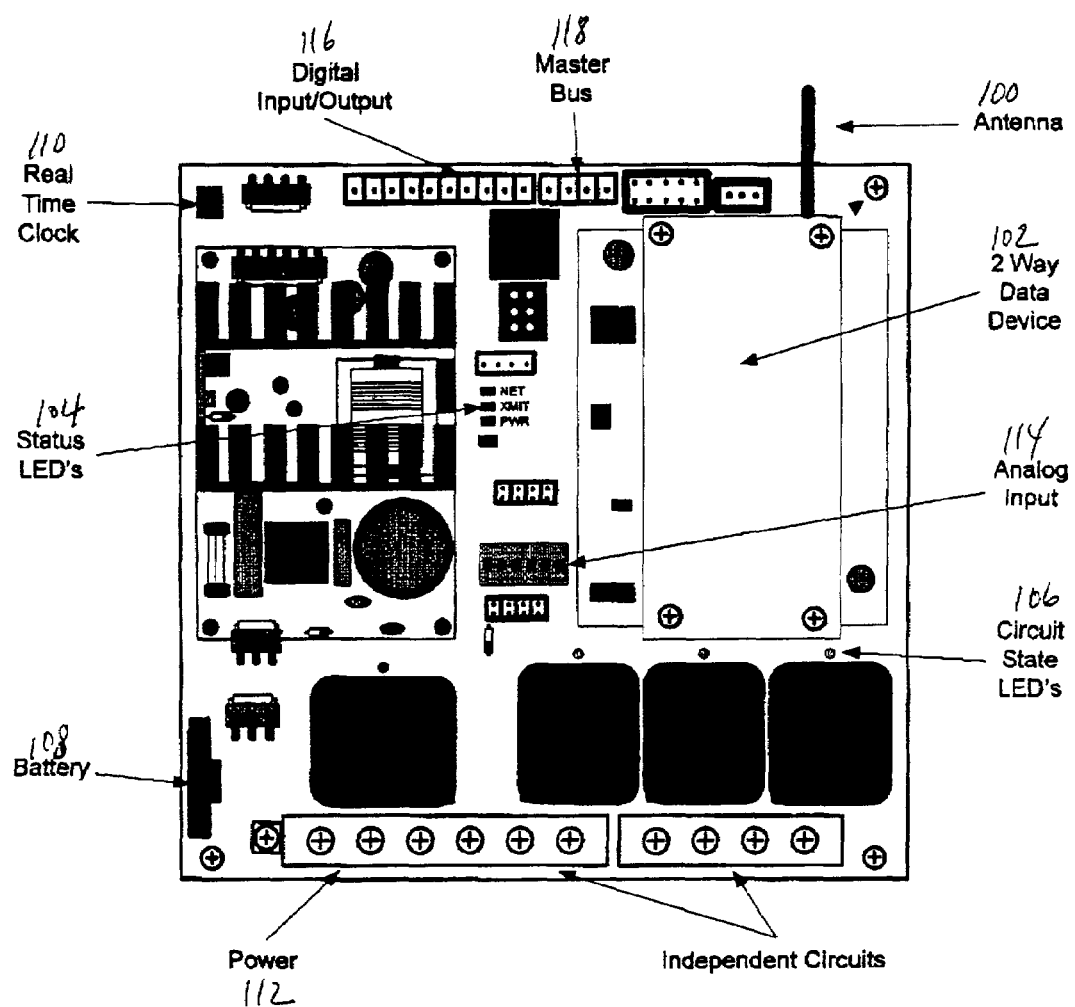

Fig. 5 - P1810 Alert Flow
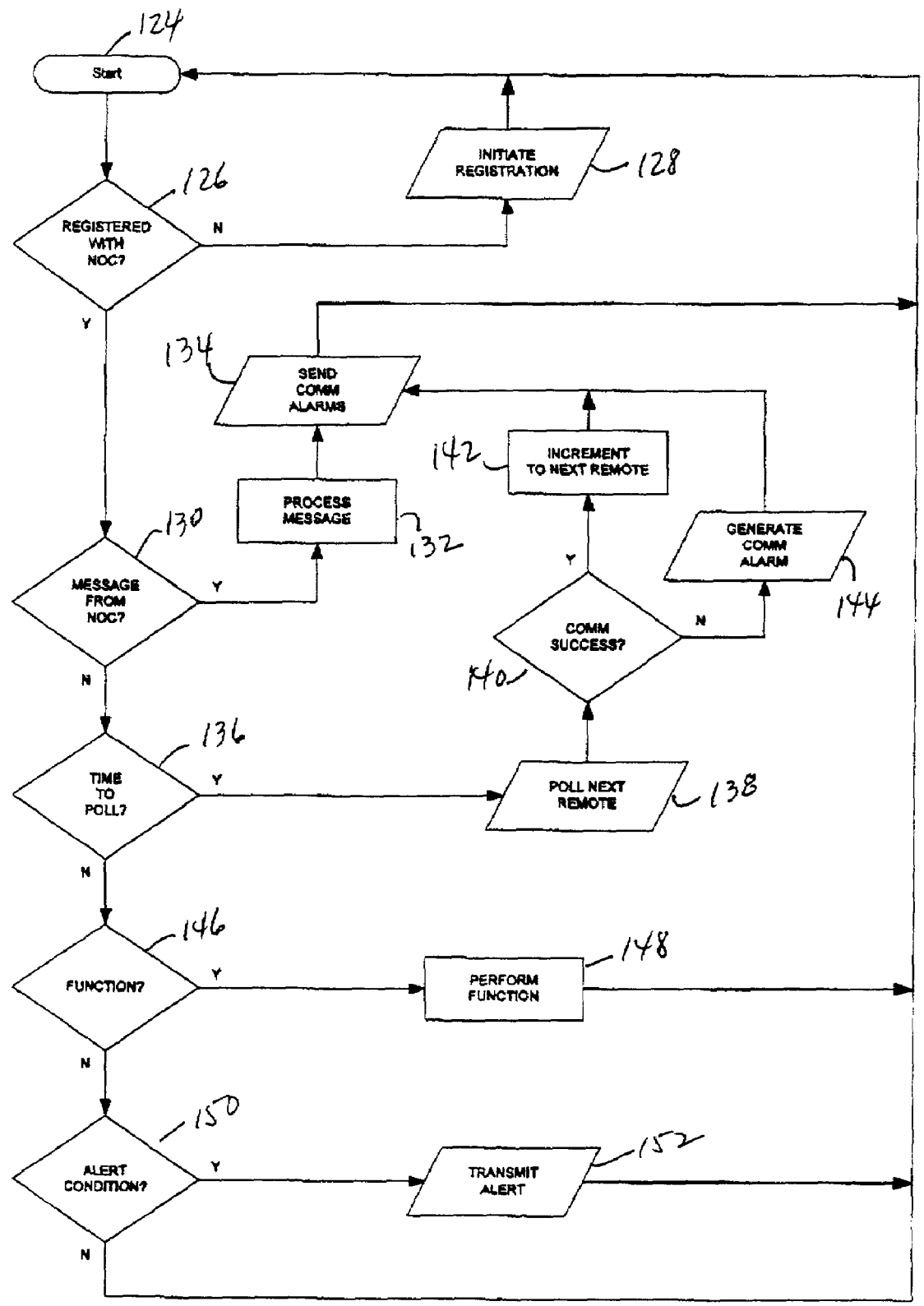

Fig. 6 - P1820 Architecture
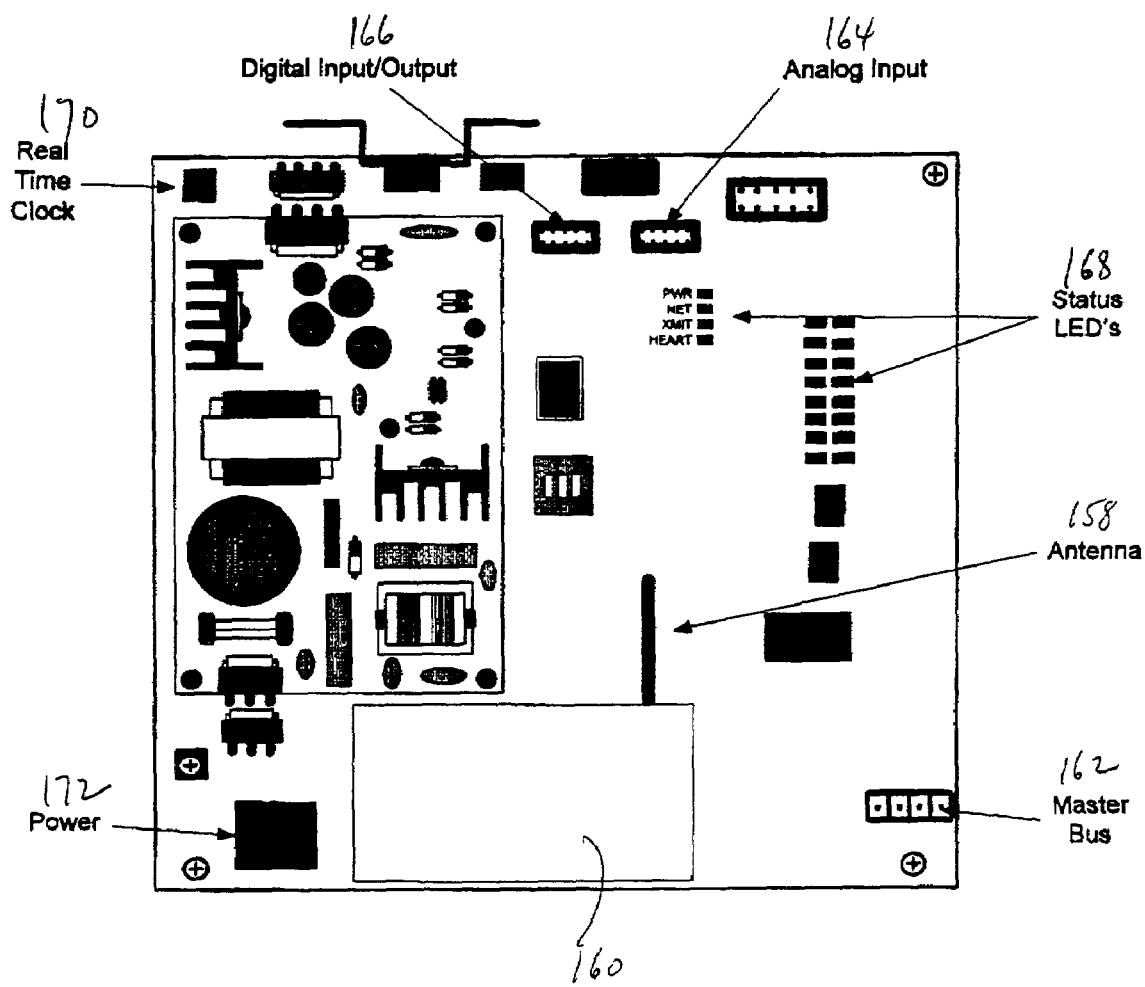

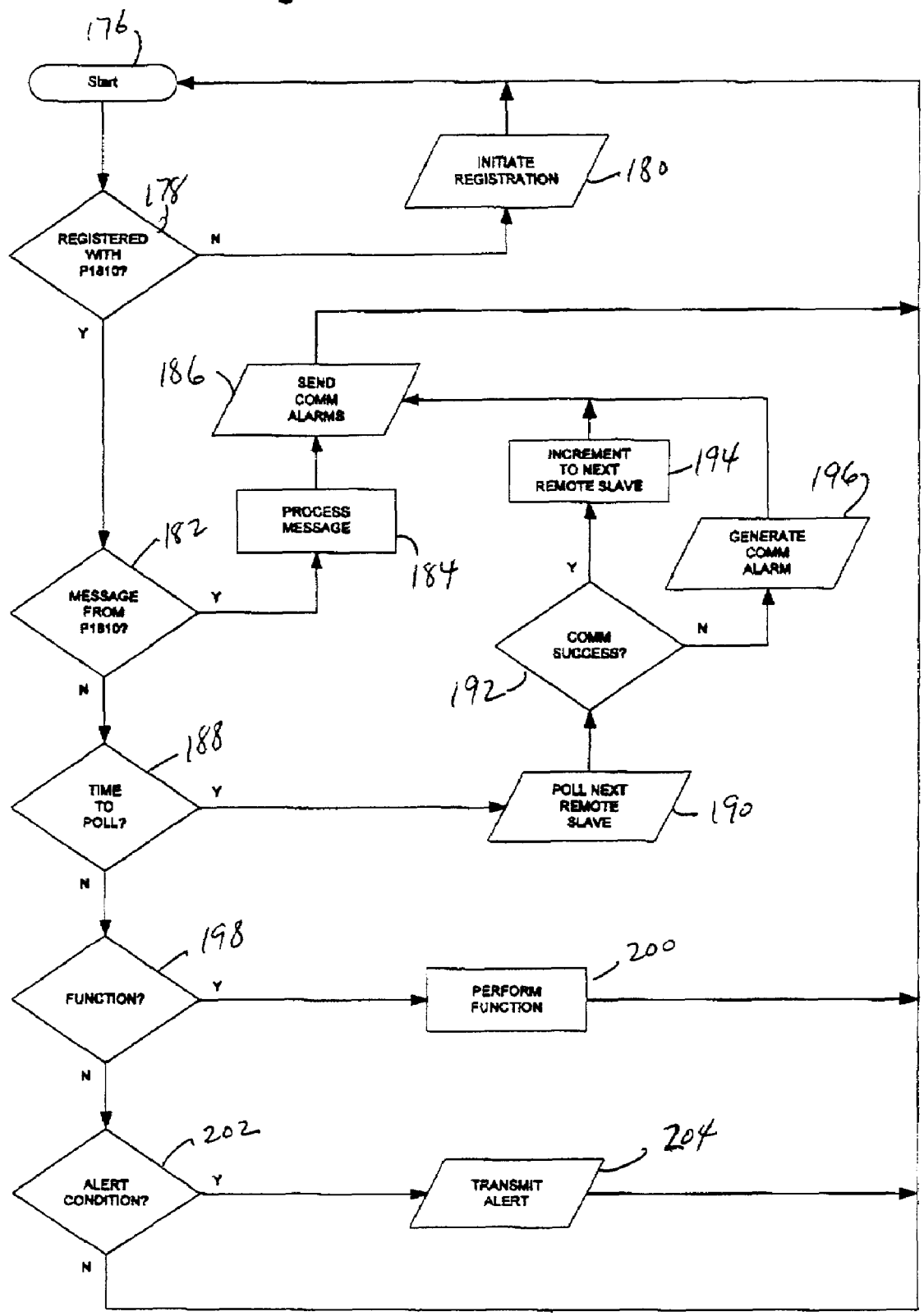
Fig. 7 - P1820 Alert Flow

Fig. 8 - P1830 Architecture
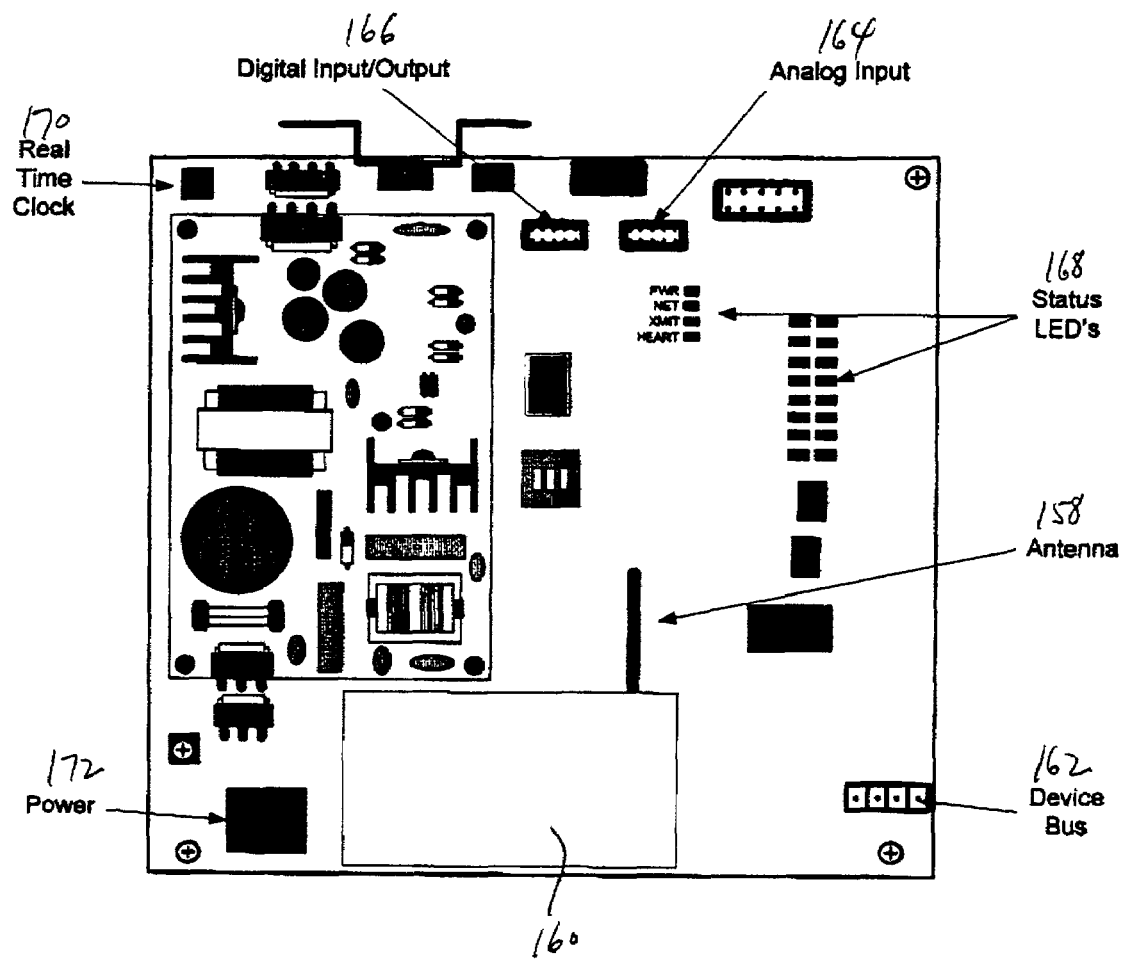

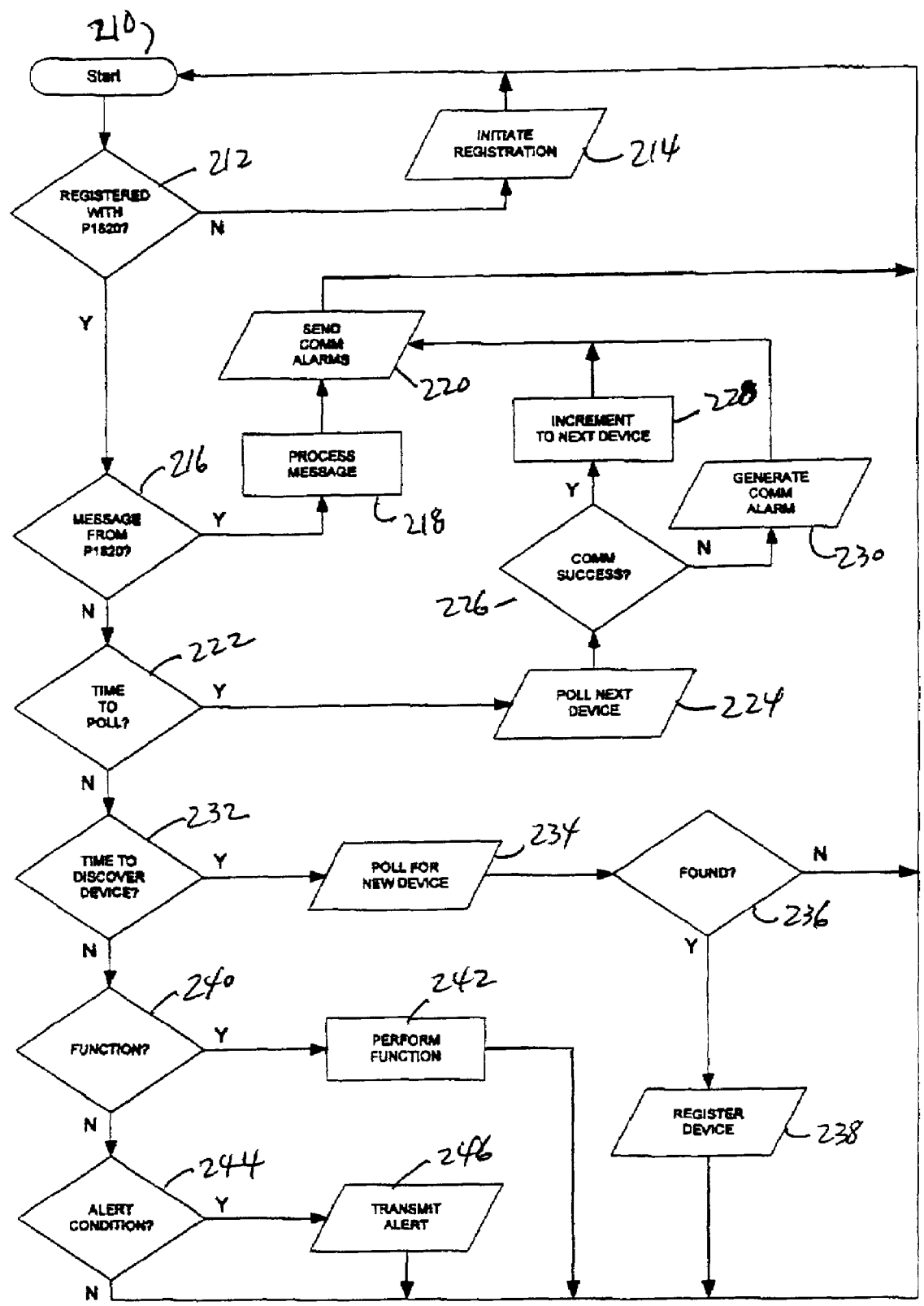
Fig. 9 - P1830 Alert Flow

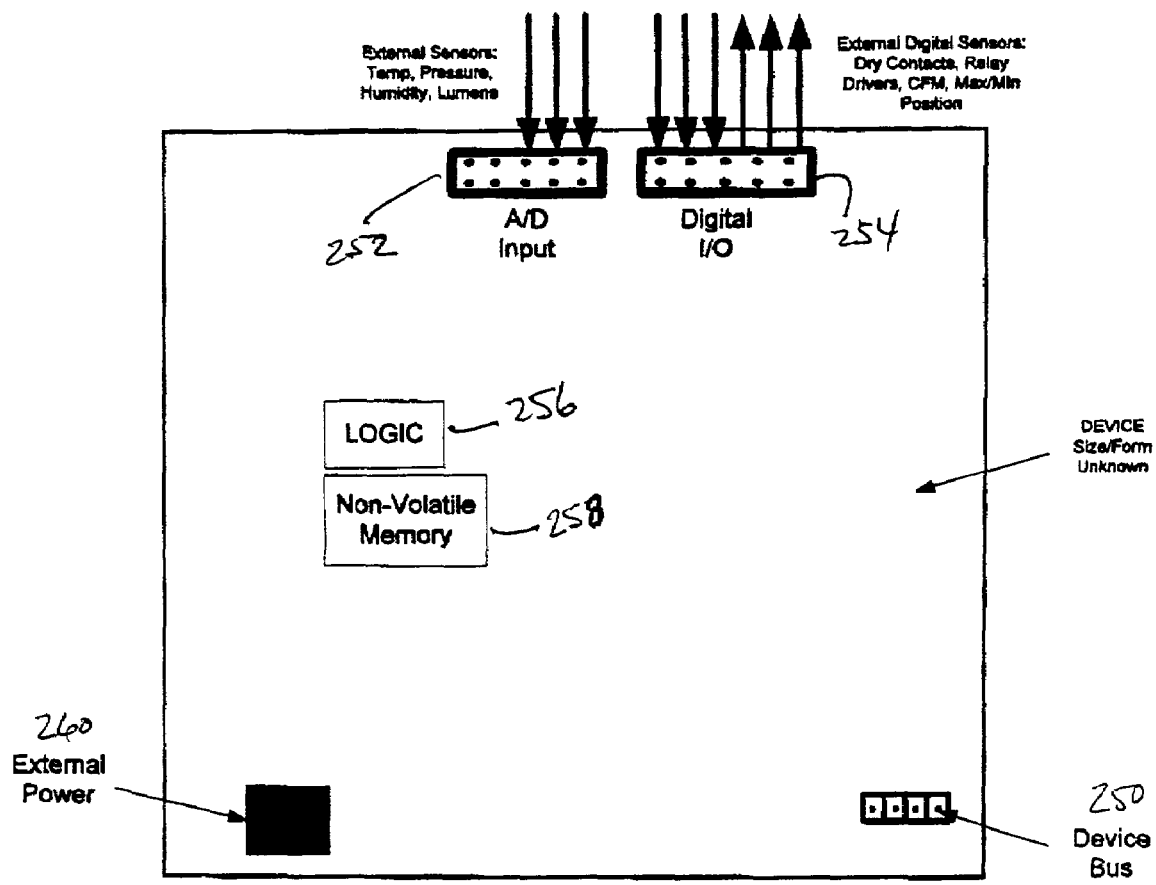
Fig. 10 - DEVICE Architecture

Fig. 11 - DEVICE Alert Flow
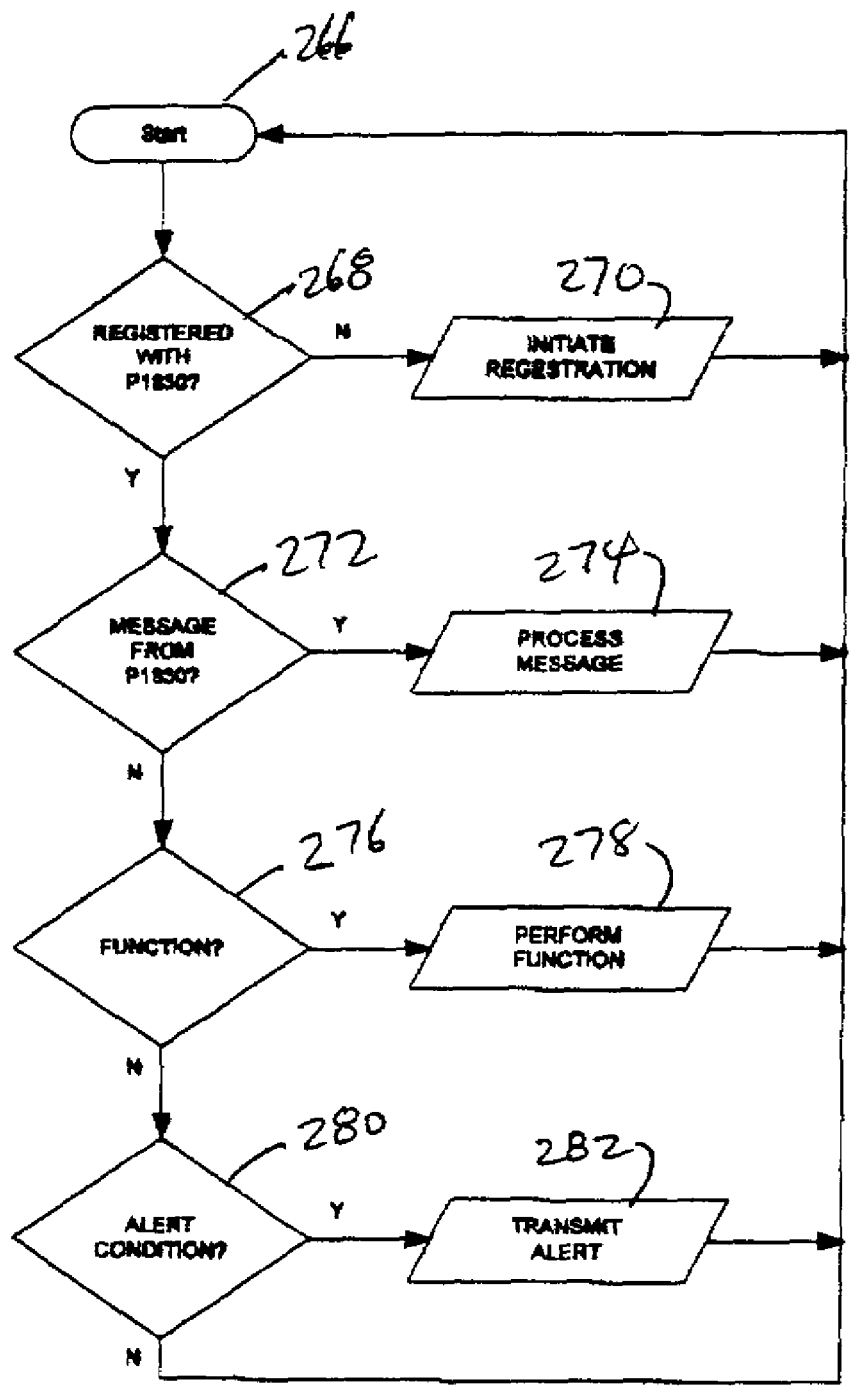

SCALABLE WIRELESS REMOTE CONTROL AND MONITORING SYSTEM WITH AUTOMATIC REGISTRATION AND AUTOMATIC TIME SYNCHRONIZATION

BACKGROUND OF THE INVENTION

The present invention relates generally to electronic systems for remotely controlling and for remotely monitoring a plurality of electrical apparatuses, and which provides for internet-based two-way communication, monitoring and control. More particularly, the present invention relates to such systems that are scalable to permit many additional apparatuses to be easily added to the existing system at a remote site, in which the newly added apparatuses automatically register upon the system during periodic registration subroutines and in which the real-time clocks of the system components are periodically corrected to the current Greenwich Mean Time by a time synchronization subroutine.

A prior monitoring and control system is shown in U.S. Pat. No. 6,236,332, which is assigned to the assignee of this invention. This system provides for two-way signaling, but does not contemplate control of a plurality of devices by the remote unit. Neither does this patent provide for automatic registration of system components or for automatic time synchronization among the system components.

Another known system for remotely controlling electrical apparatus is shown and described in U.S. Pat. No. 5,936,362, which is also assigned to the assignee of this invention. The system disclosed in this patent has wide application to a variety of different remotely located apparatus, including the lighting of signs, climate control, irrigation control, traffic control and so forth. However, this system operates through the one-way wireless transmission of radio signals from the host computer. Thus, the remote site is generally limited to a location within the range of reliable radio signaling. Electronic signaling equipment must generally be replicated at each site where the remotely controlled apparatus is located.

Yet another system is disclosed in U.S. Pat. No. 5,898,384, which is also assigned to the assignee of this invention. As taught in the preferred embodiment, this patent teaches the use of radio frequency (RF) pagers to remotely activate or deactivate electrical apparatus, with one pager required for each remote device. This system is also a one-way wireless transmission of radio signals A need exists for a system for remotely controlling and monitoring apparatus in which many additional devices may be easily and inexpensively added to the system without having to replicate the entire remote portion of the system at each remote site for each additionally added device.

A need also exists for automatically registering each system component on the control and monitoring system so that a network operating center can quickly communicate with existing and newly installed devices.

SUMMARY OF THE INVENTION

The present invention provides a microprocessor-based system for controlling and monitoring a plurality of remotely located electrical devices. A network operating center (NOC) communicates with the plurality of remotely located devices to provide control commands, to monitor current status and to receive alert conditions. Customers may connect to the NOC from their personal computers (PCs) via an Internet connection, or via a direct connection such as a dedicated line, to monitor the present status of the remote devices and/or to reprogram the control conditions. Communication from the NOC to the remote site is preferably via a worldwide data communications service to provide communication with devices at any remotely located site.

Microprocessor-based communications equipment at the remotely located site is provided with a two-way communications link to receive and transmit communications from and to the NOC. This equipment in turn communicates with a plurality of dedicated communications equipment. For example, the remotely located communications equipment may communicate with and through each piece of dedicated communications equipment to enable any of the devices to receive commands from the NOC and to send alert notifications from one or more devices to the NOC. Any additional devices to be added to the system at a later date need only be equipped to communicate with the already existing remotely located communications equipment. The NOC and/or the communications equipment at the remote location can also automatically register any newly installed devices or other communications equipment onto the system to quickly become fully operational with the NOC. The system also automatically synchronizes the real-time clocks of the system components by periodically initiating a time synchronization subroutine.

Accordingly, it is a general object of the present invention to provide a system for remotely controlling and monitoring electrical apparatus via internet-based two-way communications.

Another object of the present invention is to provide such a system that is easily and inexpensively expandable or scalable, such as by the addition of multiple new devices.

Yet another object of the present invention is to provide a system for remotely controlling and monitoring a plurality of devices that provides for automatic registration of the system components, including the devices.

A further object of the present invention is to enable customers to remotely access such a control and monitoring system to determine the present status of any remotely located devices and to reprogram any control conditions via an Internet connection to a web page associated with the NOC.

Another object of the present invention is to provide for periodic synchronization of all system components, including the remotely located devices, by periodic initiation of a time synchronization subroutine.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures in which like reference numerals identify like elements, and in which:

FIG. 4 is a plan view illustrating various internal components of one of the master units shown in FIG. 2;

FIG. 5 is a simplified flowchart of the operation of the master unit shown in FIG. 4;

FIG. 6 is a plan view illustrating various internal components of one of the remote units shown in FIG. 2;

FIG. 7 is a simplified flowchart of the operation of the remote unit shown in FIG. 6;

FIG. 8 is a plan view illustrating various internal components of one of the remote slave units shown in FIG. 2;

FIG. 9 is a simplified flowchart illustrating the operation of the remote slave unit shown in FIG. 8;

FIG. 10 is a plan view of one of the typical devices to be monitored and controlled, illustrating typical characteristics of such devices; and FIG. 11 is a simplified flowchart illustrating the operation of the typical remote device shown in FIG. 10.

DETAILED DESCRIPTION OF THE INVENTION

Figure 1:
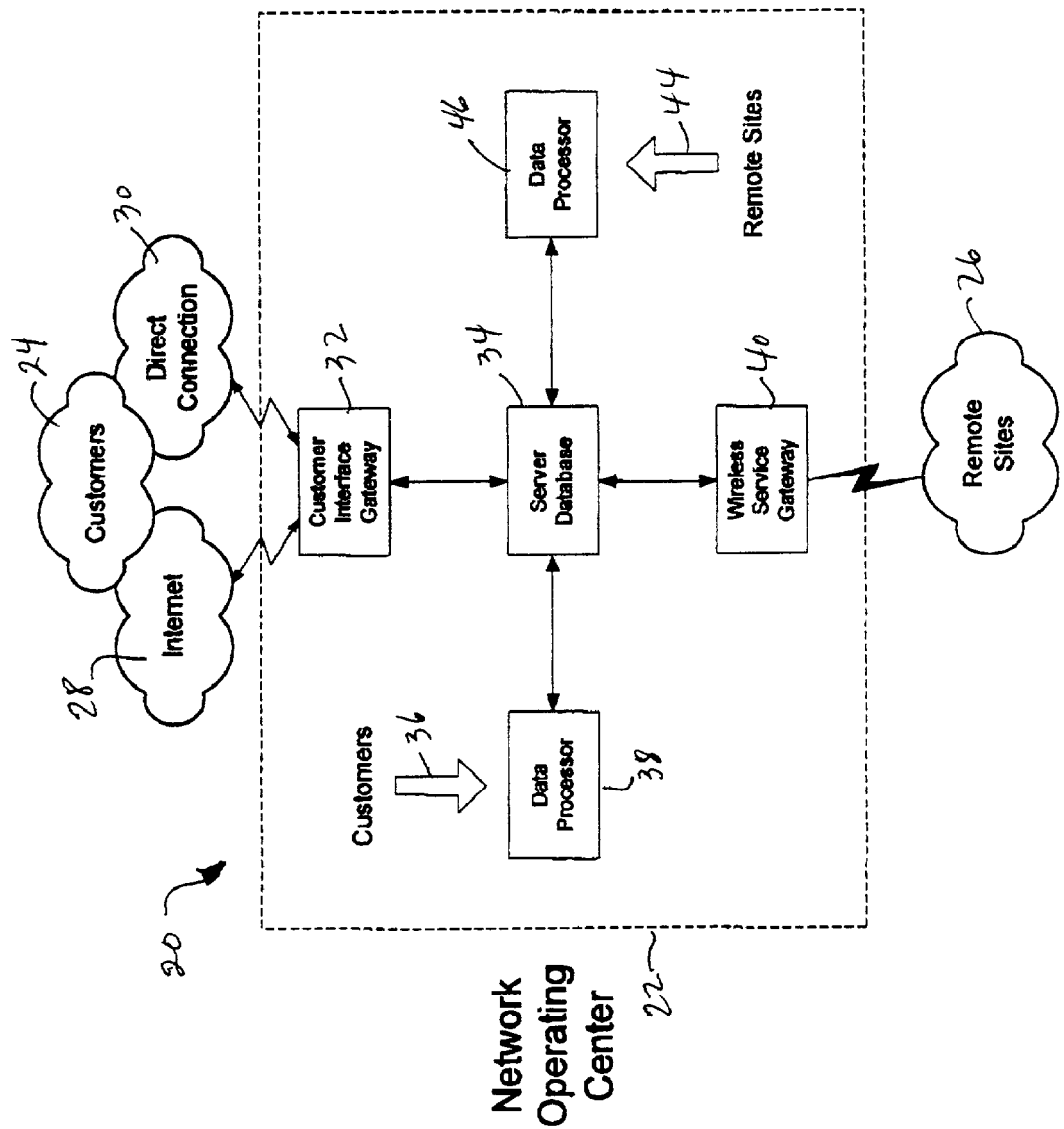
FIG. 1 is a simplified block diagram of the control and monitoring system of the present invention showing the communication links between the network operating center, the customer, and the control and monitoring units at remote sites.

Referring to the Figures, and particularly FIG. 1, a system, generally designated by reference numeral 20, controls and monitors remotely located devices. The system 20 utilizes two-way communications in accordance with the invention. FIG. 1 shows the data communications links between a network operating center (NOC) 22, customers 24, and each remote site 26 of the present invention. Each customer 24 is capable of communicating with the NOC 22 through the Internet 28 or by direct connection 30. Such customer communication may include, but is not limited to, a personal computer (PC), direct dial-up telephone line, facsimile, paging, email, data networks or even human-to-human contact.

Typically, customers will have access to software that is adapted to each particular application. For example, applications may include remotely monitoring heating, ventilation and air conditioning (HVAC), street and/or parking lot lighting, sign lighting, commercial freezers and refrigerators, traffic flow, utilities, storage tanks, and the like. This gives customers desktop control and also permits near real-time monitoring of conditions, at the remote sites. Data is preferably transmitted between each customer's PC and the NOC 22 via telephone lines and modems, such as by logging onto the Internet site associated with the NOC 22.

A customer interface gateway 32 permits full duplex communication between the customer and the NOC 22. When data is sent from the customer to the NOC, the data is stored in a server database 34. Inbound messages 36 from customers may also be routed through a customer interface gateway, such as a data processor 38. Processor 38 processes the data received from a customer 24 and periodically scans the data for commands.

"Each remote site 26 communicates with the NOC 22 via the wireless service gateway 40. Inbound messages 44 received from the remote sites may also be transmitted through a two-way wireless service network 42 (FIG. 2) to data processor 46 and then to NOC 22. For example, one wireless data service that enables worldwide coverage of remotely located devices is the Mobitex data service, which is operated by Cingular Wireless in the United States. Ericcson of Piano, Tex. makes and sells radios for Mobitex systems. Further information about Mobitex may be found at "Mobitex Internet Solutions—Here and Now," (published Aug. 19, 2002). "What Is Mobitex," (published Aug. 19, 2002). "Product Portfolio," (published Aug. 19, 2002), "Mobile Data Magazine," (published Aug. 19, 2002), and "Ericsson Modems," (published Aug. 19, 2002), which are incorporated by reference herein in their entireties.

Alternatively, the wireless service network 42 may utilize one of the digital cellular telephone standards such as GSM, TDMA or CDMA.

Data processor 46 processes data received from the remote sites 26 and periodically scans the data for inbound messages from the remote sites for processing. NOC 22 then relays data to the appropriate end receivers and provides a notification routine, which may be conducted through email, facsimile, paging networks, text embedded devices, human to human, or the like.

NOC 22 is a centralized control and monitoring facility that provides international access to remote sites and/or devices. It is also keeps track of all remote sites, all control and monitoring equipment installed at the remote sites, and all devices that are being controlled and monitored at the remote sites. NOC 22 is on line, runs continuously, and includes auxiliary power units for back up power supply in the event of a power failure. Preferably, NOC 22 is located in a secure, climate controlled facility that has access to auxiliary power. A redundant NOC 22 may also be employed; preferably in a geographical area that is served by a different electrical utility and by a different telephone company. NOC 22 activates and deactivates the customer applications, stores the "alert" notification signals and forwards the alert notifications, as necessary. Alert notifications generally occur when a sensed condition at one of the devices 92-94 falls outside of a programmed range, or above or below a programmed threshold, for example. NOC 22 also sends commands to the devices located at each remote site 26. NOC 22 further regularly communicates with the devices located at each remote site 26, and can poll them to inquire if an alert notification has been generated, or if any other performance problems are present in the system. NOC 22 also scans and processes new commands and communicates with the devices at the remote sites 26 through the wireless data network 42, for example.

The commands are preferably sent in a protocol consisting of serially transmitted frames. Two different protocols may be used for sending and receiving information, each having two layers. One layer is application independent and defines the type of interaction between each remotely located device and NOC 22 at the application level. The second layer of protocol is application dependent and defines additional information. The protocol is structured so that many types of information can be sent in the same packet of data. Each frame contains different information such as customer identification bits, product identification bits, remote unit identification bits, remote device identification bits, and the like.

Figure 3:
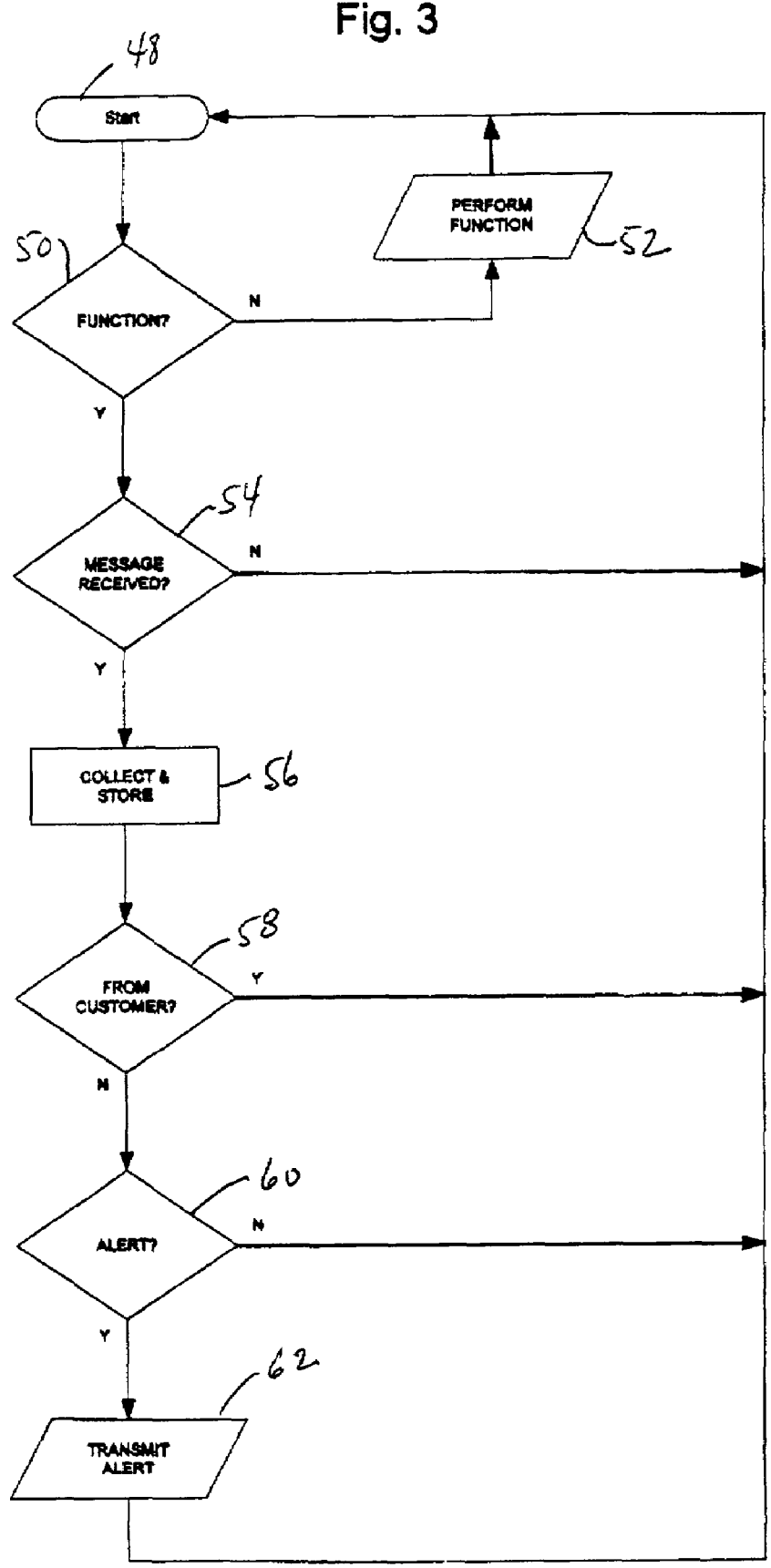
FIG. 3 is a simplified flowchart of the operation of the network operating center shown in FIG. 1.

Referring now to FIG. 3, the operation of NOC 22 is shown in flowchart format. The operation of NOC 22 begins at start block 48. The NOC 22 then determines at block 50 whether it needs to perform a particular function. The function to be performed can be, for example, transmitting a command signal to a remotely located device to activate or deactivate its associated apparatus. While making this determination at block 50, NOC 22 is in its so-called comparison mode.

If NOC 22 needs to perform a function, it does so at block 52 and then returns to its idle mode at the start block 48. For example, one of the functions that may be performed at block 52 is to poll the master unit to determine if the master unit is synchronized to Greenwich Mean Time (GMT), which is also used by NOC 22. If no function is to be performed at decision block 50, NOC determines at decision block 54 whether it has received a message from an external source. If not, NOC returns to its idle mode. If so, the NOC receives the message, processes it and stores it in memory as indicated at execution block 56, so that the data can be accessed at a future time.

Thereafter, NOC 22 determines at decision block 58 whether the message was sent by a customer or from a different source, such as from a remote device or from service personnel at the remote site. If a customer sent the received message, no alert notification subroutine needs to be performed and the NOC returns to its idle mode. However, if a customer did not send the received message, the NOC determines at decision block 60 whether it needs to perform an alert notification subroutine. If the NOC needs to perform the alert notification subroutine, it does so at block 62 and then returns to the idle mode. If not, the NOC immediately returns to its idle mode.

Figure 2:
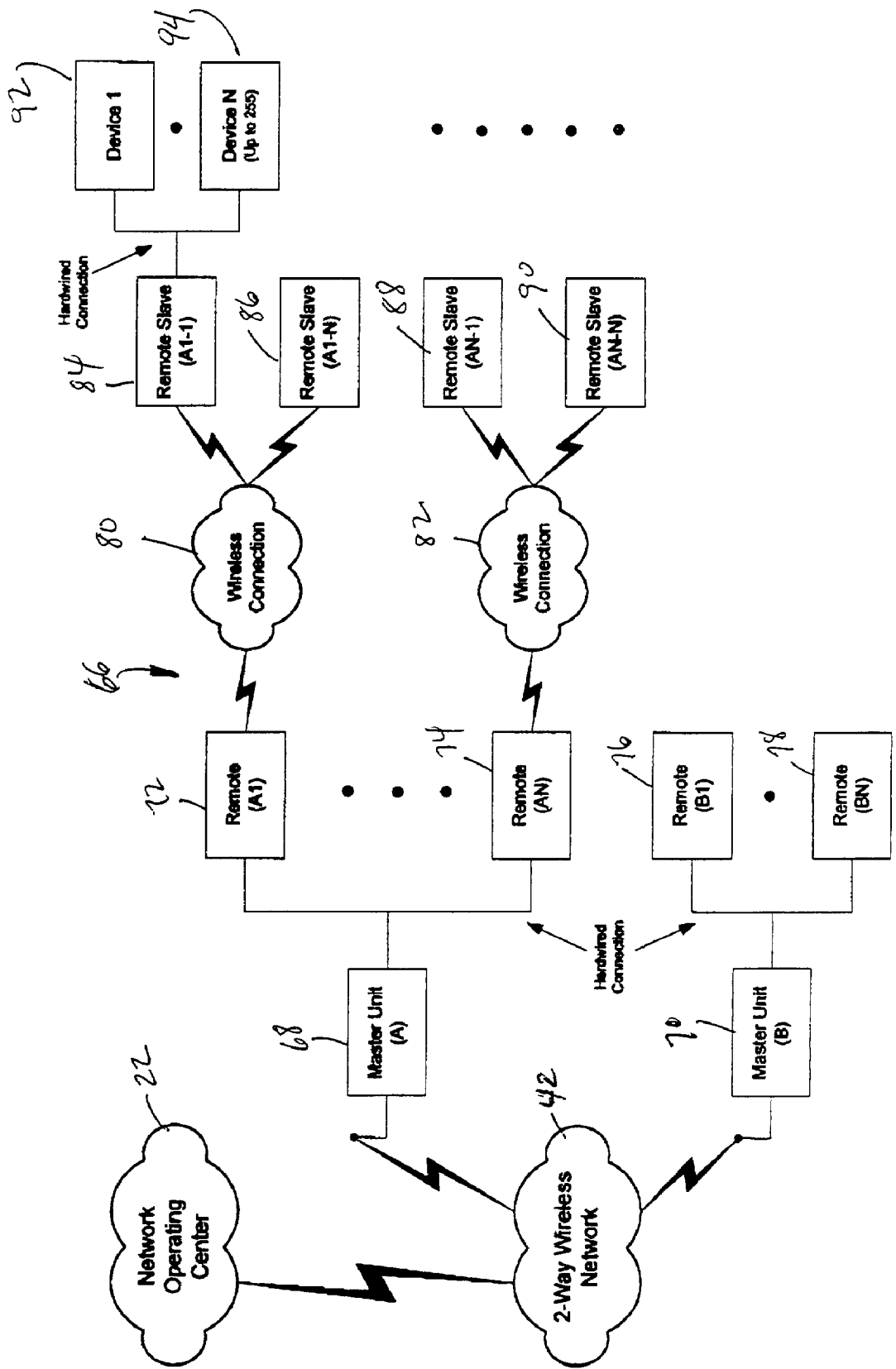
FIG. 2 is a simplified functional block diagram of that portion of the control and monitoring system that is located at the remote site illustrating the communication links between master, remote and remote slave units to control and monitor a plurality of remotely located devices.

The remotely located site, generally designated by reference numeral 66, of the control and monitoring system 20 is illustrated in FIG. 2. Remote site 66 communicates with the NOC 22 via the two-way wireless network 42, which is described above. Remote site 66 includes a collection of one or more master units 68 and 70. The remote site 66 can be scaled up to include a nearly infinite number of master units 68-70, each with a unique address or identity. The actual number of master units that can be employed will be limited in practice by the available memory of the NOC 22 or by the addressing capabilities of the NOC 22. This immense scalability provides unusual near real-time control and monitoring of large numbers of devices at a plurality of remote sites 66.

Master units 68-70 are each provided with a radio frequency (RF) transceiver to send and receive information from the wireless network 42. These master units 68 and 70 are commercially available from Profile Systems, LLC of Merrillville, Ind. under part number P1810. The P1810 master unit is also shown in FIG. 4. Further information about its functionality is presented in the flowchart of FIG. 5, which is described in more detail below.

Each master unit, for example unit 68, in turn bidirectionally communicates, such as over wire conductors, with a plurality of remote units, such as remote units 72 through 74. Preferably, communication between the master units and the remote units is pursuant to the RS485 industry standard. The number of remote units that is addressable or identifiable by a master unit is limited only by the available memory of each master unit. Remote units 72-74 are each provided with an RF transceiver to communicate in a wireless mode to a plurality of remote slave units 84-90. For example, the RF communication links 80 and 82 may be 900 MHz full duplex radio links. Remote units 72-78 are commercially available from Profile Systems, LLC under part number P1820. The P1820 remote unit is also shown in FIG. 6. Further information about its functionality is presented in the flowchart of FIG. 7, which is described in more detail below.

Each remote unit 72-78 in turn bidirectionally communicates, such as over the wireless links 80-82, with a plurality of remote slave units 84 through 90. The number of remote slave units that is addressable or identifiable by each remote unit is limited only by the available memory of each remote unit. Like the remote units 72-78, each of the remote slave units 84-90 is provided with an RF transceiver to communicate over the wireless links 80-82 to an assigned remote unit 72 or 74. Remote slave units 84-90 are commercially available from Profile Systems, LLC under part number P1830. The P1830 remote slave unit is also shown in FIG. 8. Further information about its functionality is presented in the flowchart of FIG. 9, which is described in more detail below.

Each of the master units 68-70, remote units 7278 and remote slave units 84-90 uses an application independent protocol, which includes an application dependent protocol. These protocols permit a device specific message to be routed therethrough from the NOC 22 to the intended device 92 or 94. These protocols also permit a group message to be routed therethrough, such as to a group of devices 92-94. Such group commands are particular useful in simultaneously controlling groups of devices, such as to activate, deactivate or reprogram a plurality of devices.

"The nature of the devices 92-94 varies depending upon the conditions to be monitored or controlled. For example, devices 92-94 may sense temperature, pressure, humidity, light intensity, or the like. The may also interface with dry contacts, relays, position sensors, thermostats, or the like. In general, devices 92-94 are uniquely addressable and utilize a base command set that is device independent, such as poll by address, query model by address, respond to model inquiry by address and respond to real-time clock synchronization inquiry. Devices 92-94 also utilize a specific command set that is used to program the devices and to query device specific inputs and/or outputs. For example, analog inputs and/or outputs, digital inputs/outputs or other device specific control or monitor points. One example of devices 92-94 are the programmable temperature control devices commercially available form TOS/Basys Controls of Middleton, Wis., including model numbers SZ1031, SZ1144, SZ2165, or the like. The controls are particularly application to HVAC system control and monitoring."

The mechanical structure of the P1810 master unit 68 or 70 is illustrated in FIG. 4. An antenna 100 is adapted to receive or transmit data from or to NOC 22 in a manner well known in the art. RF circuitry 102 demodulates received data and modulates data to be sent. Light emitting diodes (LEDs) 104 indicate the status of the master unit, such as power on, transmitting or receiving data, and the like. Another set of LEDs 106 indicates the status of other circuits, test modes and so forth. A battery 108 provides a back-up power supply during temporary power outages. A real-time clock 110 provides a time reference for the master unit. Power is received at a terminal block 112. Master unit 68 or 70 has provision for analog inputs at connector 114, digital inputs/outputs at connector 116 and a master bus at connector 118, such as for hard wiring to one or more of the remote units 72-78.

The operation of the P1810 master unit is shown in FIG. 5, and begins at the start block 124. The master unit first determines whether it is registered with the NOC 22 at decision block 126. If not, the registration procedure is initiated at block 128. If the master unit is already registered, operation proceeds to decision block 130 where it determines if a message has been received from the NOC 22. If so, the message is processed at block 132. If there is any failure in processing the message, a communication alarm is sent at block 134.

If there was no message from the NOC 22 at block 130, the operation proceeds to determining if it is time to poll the remote units 72-78. If so, the master unit polls the next remote at block 138. If the polling is successful at block 140, the master unit increments to poll the next remote unit at block 142. If the polling at block 138 encounters communication problems, as at block 140, a communications alarm is generated at block 144. If it is not time to poll at block 136, the master unit determines whether any function needs to be performed at block 146. The master units 68 or 70 may poll their respective remote units 72-78 as one of the functions to determine if the remote units are synchronized to GMT; and if not, any of the remote units 72-78 may correct its time to the GMT time included in the inquiry. If any other functions are pending, those functions are also executed at block 148. If not, the process goes to decision block 150 to determine if any alert condition has been received from any remote unit. If so, the alert condition is transmitted to NOC 22 at block 152. After taking the appropriate actions, blocks 128, 134, 148, 152, and the "no" branch of decision block 150, all return to the idle state at start block 124.

The mechanical configuration of the P1820 remote units 72-78 is shown in FIG. 6. An antenna 158 receives or transmits data over the transmission links 80-82 from and to the remote slave units 84-90. RF circuitry 160 demodulates received data and modulates data to be sent. In a manner similar to the P1810 master units 68-70, a connector 162 is provided for the master bus, a connector 164 is provided for analog inputs, and a connector 166 is provided for digital inputs/outputs. A plurality of LEDs 168 provide various status indications, including power, receive/transmit, and the like. A real-time clock 170 provides a time reference for the remote unit. Power is received at a connector 172.

The operation of the P1820 remote unit 72-78 is illustrated in FIG. 7. As can be readily seen, operation of the P1820 remote unit is analogous to the operation of the P1810 master unit, except that it operates from a different hierarchical level in the system. From the start position of block 176, the remote unit first determines whether it is registered with its associated master unit 68 or 70 at block 178. If not, the registration procedure is initiated at block 180. If the remote unit is already registered, operation proceeds to decision block 182 where it determines if a message has been received from its associated master unit. If so, the message is processed at block 184. If there is any failure in processing the message, a communication alarm is sent at block 186.

If there was no message from the associated slave unit 68 or 70, the operation proceeds to determining if it is time to poll a remote slave unit 84-90 at block 188. If so, the next remote slave unit is polled. If the polling is successful at block 192, the remote unit increments to poll the next remote slave unit at block 194. If the polling at block 190 encounters any communication problems, as at block 192, a communications alarm is generated at block 196. If it is not time to poll at block 188, the remote unit determines whether any function needs to be performed at block 198. The remote units may poll their respective remote slave units 84-90 as one of the functions to determine if the remote slave units are synchronized to GMT; and if not, any of the remote slave units 84-90 may correct its time to the GMT time included in the inquiry. If any other functions are pending, those functions are also executed at block 200. If not, the process continues to decision block 202 to determine if any alert condition has been received from any remote slave unit. If so, the alert condition is transmitted to the associated master unit at block 204. After taking the appropriate actions, blocks 180, 186, 200, 204, and the "no" branch of decision block 202, all return to the idle state at start block 176.

The mechanical configuration of the P1830 remote slave units 84-90 is shown in FIG. 8. As can be seen by comparison with the mechanical configuration of the P1820 remote unit shown in FIG. 6, these respective units are quite similar. Thus, the same reference numerals will be used for similar elements, and the description of these elements will not be repeated here.

The operation of the P1830 remote slave unit is illustrated in the flowchart of FIG. 9. While there are some similarities to the operation of the remote unit in FIG. 7, there are also numerous differences. Operation of the remote slave unit 84-90 begins at the start block 210. The remote slave unit first determines whether it is registered with its associated remote unit at decision block 212. If not, the registration procedure is initiated at block 214. If the remote slave unit is already registered, operation proceeds to decision block 216 where it determines if a message has been received from its associated remote unit. If so, the message is processed at block 218. If there is any failure in processing the message, a communication alarm is sent at block 220.

If there was no message from the associated remote unit at block 216, the operation proceeds to determining if it is time to poll the next device 92 or 94 at block 224. If the polling is successful at block 224, the remote slave unit increments to poll the next device at block 228. If the polling at block 224 encounters communication problems, as at block 226, a communications alarm is generated at block 230. If it is not time to poll at block 222, the remote slave unit determines whether it is time to identify any new devices on the system at block 232. If so, the remote slave unit polls for any new devices at block 234. If new devices are found at block 236, such new devices are registered on the system at block 238. If it was not time to identify any new devices at block 232, the remote slave unit determines whether any function needs to be performed at block 240. The remote slave units 84-90 may poll their respective devices 92-94 as one of the functions to determine if the devices are synchronized to GMT; and if not, any of the devices 92-94 may correct its time to the GMT time included in the inquiry. If any other functions are pending, those functions are also executed at block 242. If not, the process continues to decision block 244 to determine if any alert condition has been received from any device 92-94. If so, the alert condition is transmitted to the associated remote unit at block 246. After taking the appropriate actions, blocks 214, 220, 236, 238, 242, and the "no" branch of decision block 244, all return to the idle state at start block 210.

A typical device 92-94 is shown in FIG. 10. Due to the wide variety of applications and the wide variety of remotely sensed, controlled or monitored conditions of the system 20, devices 92-94 may take on many forms and/or sizes. However, in general, a device bus connector 250 will facilitate interconnection with and communication between each device and an associated remote slave unit, preferably in accordance with the RS485 industry standard. For example, if eight-bit addressing is utilized, the remote slave unit 84 can communicate with up to 256 devices 92-94. However, if one of the eight-bit addresses is reserved for an idle mode, such as the address consisting of all zeros, 255 potential addresses remain. The device may also have an analog to digital input connector 252 to interface with external sensors such as for sensing temperature, pressure, humidity, light intensity, and the like. The device may also have a digital input/output connector 254 to interface with digital sensors, such as position sensors, relays, and the like. Logic circuitry 256 will convert analog sensor signals to digital signals. Non-volatile memory 258 will store the configuration of the device, including its unique address or identity. External power may be provided at a connector 260.

The operation of a typical device 92-94 may vary considerably depending upon the application. However, some common and basic functions are shown in FIG. 11. Operation begins at start block 266, and proceeds to block 268 to determine if the device is registered with its associated remote slave unit. If not, registration is initiated at block 270. If the device is already registered, block 272 determines whether a message has been received from its associated remote slave unit. If so, the message is processed at block 274. If no message has been received, block 276 determines whether any function needs to be performed. If so, the function is executed at block 278. If not, the process continues to block 280 to determine if the device or its sensors have detected any alert condition. If so, the alert condition is transmitted to the remote slave unit associated with the device. After taking any appropriate actions, blocks 270, 274, 278, 282, and the "no" branch of decision block 280, all return to the idle state at start block 266.

When any alert condition is detected at device 92 or 94, the alert condition is transmitted from the device to the associated P1830 remote slave unit, which in turn transmits the alert condition to its associated P1820 remote unit, which in turn transmits the alert condition to its associated P1810 master unit, which in turn transmits the alert condition to the NOC 22. Any alert condition is thus daisy-chained from the device that detected the condition to NOC 22.

While the NOC 22, the master units 68-70, the remote units 72-78 and the remote slave units 84-90 keep reasonably accurate time, typical devices may or may not be accurate in time. It is thus important in determining the time of any alert notification to periodically update and synchronize the time to the GMT time throughout the system 20, including at the devices 92-94. The NOC 22 is also capable of keeping diurnal time for accurately activating or deactivating devices 92-94 that are related to sunset and sunrise, such as lighting systems. The NOC also automatically adjusts for Daylight Savings Time.

Similarly, devices 92 and 94 register with the P1830 remote slave unit 84, the P1830 remote slave unit 84 registers with the P1820 remote unit 72 and the P1820 remote unit 72 registers with the P1810 master unit 68. All of these registration steps are daisy chained to NOC 22. Of course, the P1810 master unit 68 registered directly with NOC 22. Thus, NOC 22 knows the architecture of its system and the identity of all components on the system. New components can be added to the system, or components can be removed from the system, and NOC 22 will be periodically updated on such changes through the registration subroutines of each component on the system.

With the structure and functionality of the remote control and monitoring system 20 considered above, it may now be instructive to consider a typical installation of the remote portion 66 of the system at a remote site 26. One example is a HVAC system installed at a shopping center. About 20 to 50 HVAC units may be disposed on the roof of a large shopping center, with each HVAC unit responsible for controlling the temperature of a particular area or zone in the shopping center. A device 92 and a remote slave unit 84 will be located at each HVAC unit to monitor its performance. Each device 92 may have a remotely located temperature sensor disposed in a respective zone to monitor the interior temperature. One master unit 68 and one remote unit 72 may be located anywhere that provides effective communication over the wireless link 80 between the remote unit 72 and the plurality of remote slave units 84 at each HVAC unit. It can be readily appreciated that this wireless link 80 saves on the significant expense of hard-wiring the remote unit 72 to the plurality of remote slave units that are scattered across the roof of the shopping center. Of course, if attempted, any hard-wiring may have to be in metal conduit with weatherproof fittings to conform to local building codes and electrical codes. If additional HVAC units are added, or some existing HVAC units are removed, the system 20 easily accommodates such modifications without the need to change a hard-wired system.

While particular embodiments of the invention have been shown and described, it will be obvious to those skilled in the art that changes and modifications may be made therein without departing from the invention in its broader aspects. Therefore, the aim of the appended claims is to cover all such changes and modifications as fall within the true spirit and scope of the invention.

The invention claimed is:

1. A system for controlling, monitoring and receiving data from a plurality of devices of various types located at a remote site, said system comprising:

a network operations center for keeping track of one or more remote sites, said network operations center having a plurality of protocols for a plurality of applications, said network operating center having means for selecting one of said protocols corresponding to one of said applications;

a customer interface having two-way communications with said network operating center to allow a customer's applications to control and monitor said plurality of remotely located devices, said customer interface further providing an ability to receive messages relating to an alert condition at one or more of the plurality of remotely located devices;

a master unit to bi-directionally communicate directly with the network operations center via a network, said master unit also being in bi-directional communication with one or more remote units, wherein the master unit permits scaling up or down the number of remote units communicating with the master unit;

a remote slave unit located at the remote site, said remote slave unit being in two-way communication with the plurality of devices and with at least one remote unit, wherein the at least one remote unit bi-directionally communicates directly with both the remote slave unit and the master unit;

wherein the remote slave unit periodically initiates a registration subroutine to poll the plurality of devices to determine the identity of each of the devices, and to automatically register any new devices on the system; and wherein the remote slave unit is adapted:
to send notification of alert conditions from any one of the plurality of devices to the network operating center, via the at least one remote unit and the master unit, and
to receive reprogramming commands from the customer interface, via the master unit and the at least one remote unit, and to transmit the reprogramming commands to any of the plurality of devices.

2. The system as claimed in accordance with claim 1, wherein notification of alert conditions are communicated from the remote slave unit to the at least one remote unit, then from the remote unit to the master unit and finally from the master unit to the network operating center.

3. The system as claimed in accordance with claim 2 wherein the master unit communicates with the network operating center via a two-way wireless network and the remote slave unit communicates with the remote unit via a two-way radio frequency link.

4. The system as claimed in accordance with claim 1 wherein the network operating center has a real-time clock synchronized to Greenwich Mean Time, and the network operating center periodically polls the system to determine if the remote slave unit and if the plurality of devices are synchronized to the same time.

5. The system as claimed in accordance with claim 4 wherein the network operating center includes the current GMT time in its polling message to assist the remote slave unit in synchronizing to the current GMT time.

6. The system as claimed in accordance with claim 1 wherein new devices may be installed on the system and be placed in communication with the same remote slave unit.

7. The system as claimed in accordance with claim 6 wherein up to 255 devices are in communication with the remote slave unit.

8. The system according to claim 1, wherein at least one of the remotely located devices is a temperature sensor.

9. The system according to claim 1, wherein at least one of the remotely located devices monitors an HVAC unit.

10. A system for controlling, monitoring and receiving data from a plurality of devices of various types located at a remote site, said system comprising:

a network operations center for keeping track of one or more remote sites, said network operations center having a plurality of protocols for a plurality of applications, wherein said network operating center selects one of said protocols corresponding to one of said applications;

a customer interface having two-way communications with said network operating center to allow customer's applications to control and monitor said plurality of remotely located devices, said customer interface further providing an ability to receive messages relating to an alert condition at one or more of the plurality of remotely located devices;

a master unit to bi-directionally communicate directly with the network operations center via a network, said master unit also being in bi-directional communication with one or more remote units via a network, wherein the master unit permits scaling up or down the number of remote units communicating with the master unit;

a remote unit in bi-directional communication with the master unit;

a remote slave unit located at the remote site, said remote slave unit in two-way communication with the plurality of devices and with at least one remote unit;

at least one remote unit bi-directionally communicates directly with both the remote slave unit and the master unit;

wherein the remote slave unit periodically initiates a registration subroutine to poll the plurality of devices to determine the identity of each of the devices, and to automatically register any new devices on the system; and wherein the remote slave unit is adapted:
to send notification of alert conditions from any one of the plurality of devices to the network operating center, via the at least one remote unit and the master unit, and
to receive reprogramming commands from the customer interface, via the master unit and the at least one remote unit, and to transmit the reprogramming commands to any of the plurality of devices.

11. The system as claimed in accordance with claim 10, wherein notification of alert conditions are communicated from the remote slave unit to the at least one remote unit, then from the remote unit to the master unit and finally from the master unit to the network operating center.

12. The system as claimed in accordance with claim 11 wherein the master unit communicates with the network center via a two-way wireless network and the remote slave unit communicates with the remote unit via a two-way radio frequency link.

13. The system according to claim 10, wherein at least one of the remotely located devices is a temperature sensor.

14. The system according to claim 10, wherein at least one of the remotely located devices monitors an HVAC unit.

15. A system for controlling, monitoring and receiving data from a plurality of devices of various types located at a remote site, the system comprising:

a network operations center for keeping track of one or more remote sites, said network operations center having a plurality of protocols for a plurality of applications, the network operating center selecting one of the protocols corresponding to one of the applications;

a customer interface having two-way communications with the network operating center to allow a plurality of applications to control and monitor the plurality of remotely located devices, the customer interface further providing an ability to receive messages relating to an alert condition of at least one of the plurality of devices;

a master unit to hi-directionally communicate directly with the network operations center via a network, said master unit also being in bi-directional communication with one or more remote units, wherein the master unit permits scaling up or down the number of remote sites communicating with the master unit;

at least one remote unit, hard-wired to the master unit, to communicate with the master unit;

a first remote slave hard-wired to a first set of the plurality of devices, to wirelessly communicate with a first remote unit of the at least one remote unit;

a second remote slave hard-wired to a second set of the plurality of devices, to wirelessly communicate with a second remote unit of the at least one remote unit;

wherein the second remote slave periodically initiates a registration subroutine to poll the second set of plurality of devices to determine the identity of each of the second set of plurality of devices, and to automatically register any new devices on the system;

wherein the first remote slave periodically initiates a registration subroutine to poll the first set of plurality of devices to determine the identity of each of the first set of plurality of devices, and to automatically register any new devices on the system; and wherein two-way communication is established between the network operating center for sending notification of alert conditions from any one of the first set and the second set of the plurality of devices, to the network operating center and for sending reprogramming commands from the customer interface to any of the first set and the second set of the plurality of devices.

* * * * *